H. A. KLEINE.
VEHICLE FENDER.
APPLICATION FILED MAY 5, 1920.

1,373,822.

Patented Apr. 5, 1921.

Inventor
HARRY A. KLEINE,
By his Attorney
Geo. Wm. Hiatt

UNITED STATES PATENT OFFICE.

HARRY A. KLEINE, OF JERSEY CITY HEIGHTS, NEW JERSEY.

VEHICLE-FENDER.

1,373,822.  Specification of Letters Patent.  Patented Apr. 5, 1921.

Application filed May 5, 1920. Serial No. 378,944.

*To all whom it may concern:*

Be it known that I, HARRY A. KLEINE, a citizen of the United States, and a resident of Jersey City Heights, county of Hudson, and State of New Jersey, have invented certain new and useful Improvements in Vehicle-Fenders, of which the following is a specification.

While applicable as a safeguard for traction vehicles generally, my invention is designed more particularly for use in connection with automobiles, as a means of affording a resilient fender yieldable at slight pressure, but with increasing resistance in emergency,—the invention consisting in the specific combination and arrangement of parts described and claimed,—the distinctive feature being the pneumatic fender mount comprising a sealed horizontal elongate medial air reservoir formed with end cylinders positioned at right angles thereto, air compression pistons in said cylinders the rods of which support the buffer bar, and cylinder caps formed with bearings for the piston rods and also formed with open air vents for the free access of the atmosphere to, and its escape from, the front of the pistons, as and for the purpose herein set forth.

Figure 1:
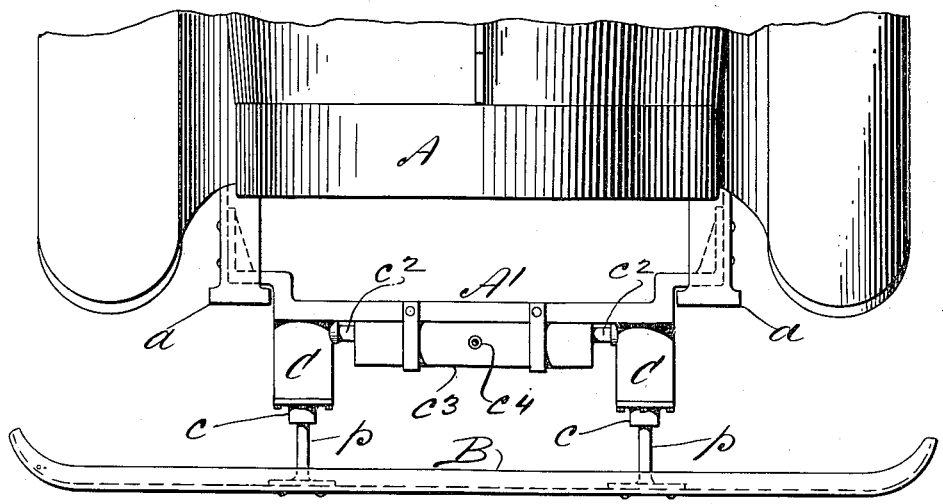
Figure 2:
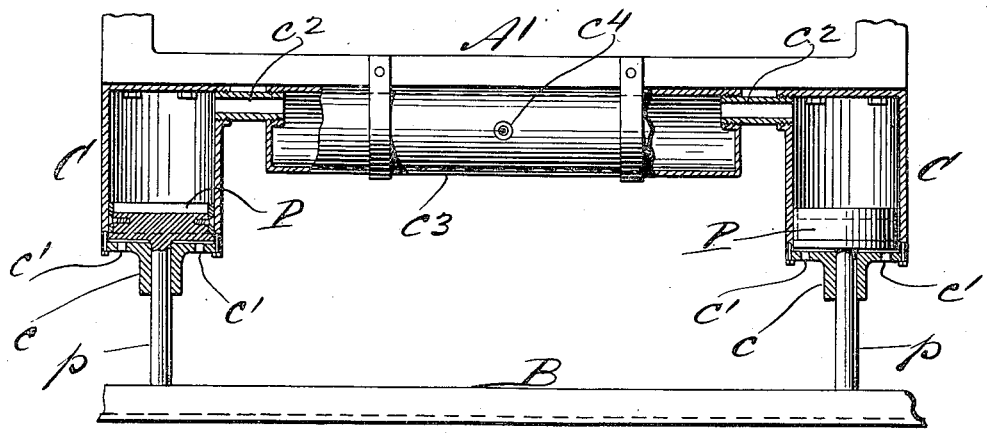

In the accompanying drawings,

Figure 1, is a top view of the front portion of an automobile equipped with my pneumatic fender mount; and Fig. 2, is a sectional elevation on a larger scale of the fender mount.

A, designates the forward portion of the body of an automobile,—$a, a$, representing the forward ends of the side members of the chassis frame, to and between which the supporting bracket $A'$, for my pneumatic fender mount is rigidly secured, as indicated in Fig. 1.

The buffer bar B, is rigidly secured to the outer ends of piston rods $p, p$, which are slidably supported in bearings in the caps $c, c$, of the cylinders C, C, in which the pistons P, P, are located, said cylinders being rigidly attached to the auto-bracket $A'$. The cylinder caps $c, c$, are provided with vent holes $c', c'$, (Fig. 2) or otherwise formed to give free access to the atmosphere.

The cylinders C, C, are connected pneumatically so as to distribute and equalize the air pressure in and between them. Hence I connect them by means of a conduit $c^2$, and forming part of or interposed in this conduit $c^2$, is an air chamber or reservoir $c^3$, by which the volume of air available for compression, etc., is augmented.

The pistons P, are of course provided with cup leather or other packings that render them air tight peripherally as related to the cylinders. The air confined within the cylinders C, conduit $c^2$, and reservoir $c^3$, may be placed under any desired or appropriate degree of initial pressure, as may be found most expedient; and for this purpose the reservoir $c^3$, or the connecting conduit $c^2$, or either one of the cylinders C, may be provided with a force tube-coupling nipple $c^4$, of any desired or well known construction, so that the desired pneumatic pressure may be attained by an ordinary force pump such as forms the usual adjunct of an automobile outfit.

It is obvious that in case of the impingement of any extraneous object against the buffer member B, or of the buffer member against such object, the stress of impact will be transmitted through the piston rods $p$, and pistons P, to the air confined in the cylinders C, C, and thence to the reservoir $c^3$, which latter will act as an equalization chamber to receive and distribute the pressure. It is also obvious that the resistance afforded by the confined air to the inward movement of the pistons P, P, will be relatively slight at first, but will be augmented in proportion to the additional degree of compression imparted to the confined air by the inward travel of the pistons P, so that the shock will be met and neutralized gently and gradually, thus tending to obviate harmful results, and lessening the danger of serious injury to person or property.

In fact by my invention I substitute an elastic resilient air spring or cushion which adapts itself automatically to stress of fender collision, absorbing and neutralizing the shock gradually, in lieu of the more positive, relatively stiff, rigid metallic springs heretofore used for the purpose, contact with which is apt to be disastrous.

I have herein shown my pneumatic fender mount as applied to the front of an automobile, with the understanding that the same may be duplicated at the rear thereof if desired.

What I claim as my invention and desire to secure by Letters Patent is,

A vehicle fender of the character designated, comprising a sealed horizontal elongate medial air reservoir formed with end cylinders positioned at right angles thereto, air compression pistons in said cylinders the rods of which support the buffer bar, and cylinder caps formed with bearings for said piston rods and also formed with open air vents for the free access of the atmosphere to, and its escape from, the front of the pistons, for the purpose set forth.

HARRY A. KLEINE.

Witnesses:
J. D. McKechnie,
Geo. Wm. Miatt.